United States Patent [19]

Lee et al.

[11] Patent Number: 5,258,945
[45] Date of Patent: Nov. 2, 1993

[54] METHOD AND APPARATUS FOR GENERATING MULTIPLES OF BCD NUMBER

[75] Inventors: Hsiao-Peng S. Lee; David Jarosh, both of Sunnyvale, Calif.

[73] Assignee: Amdahl Corporation, Sunnyvale, Calif.

[21] Appl. No.: 814,407

[22] Filed: Dec. 23, 1991

[51] Int. Cl.$^5$ .................................................. G06F 7/52
[52] U.S. Cl. ........................................................ 364/756
[58] Field of Search ................................. 364/755, 756

[56] References Cited

U.S. PATENT DOCUMENTS 3,641,331 2/1972 Kreidermacher et al. ............ 364/756
3,798,434 3/1974 Melcher .................................. 364/756

*Primary Examiner*—Long T. Nguyen
*Attorney, Agent, or Firm*—Fliesler, Dubb, Meyer & Lovejoy

[57] ABSTRACT

The times-two ($\times 2$) through times-nine ($\times 9$) multiples of a supplied multi-digit BCD number are produced using one machine cycle for performing a set-up operation and thereafter one additional machine cycle for producing all the $\times 2$–$\times 9$ multiples. A multiples generating circuit in accordance with the invention comprises: (a) an operand-storing register (OSR); (b) a multiple-storing register (MSR); (c) a multiplexer having a first input coupled to the output of the operand-storing register (OSR) and a second input coupled to the output of the multiple-storing register (MSR); (d) a $\times 3$ unit having an input coupled to the output of the multiplexer and an output coupled to the input of the MSR; (e) a first $\times 2$ unit having an input coupled to the output of the OSR; (f) a second $\times 2$ unit having an input coupled to the output of the first $\times 2$ unit; (g) a third $\times 2$ unit having an input coupled to the output of the second $\times 2$ unit; (h) a fourth $\times 2$ unit having an input coupled to the output of the MSR; (i) a $\times 5$ unit having an input coupled to the output of the OSR; and (j) a $\times 7$ unit having an input coupled to the output of the OSR.

14 Claims, 9 Drawing Sheets

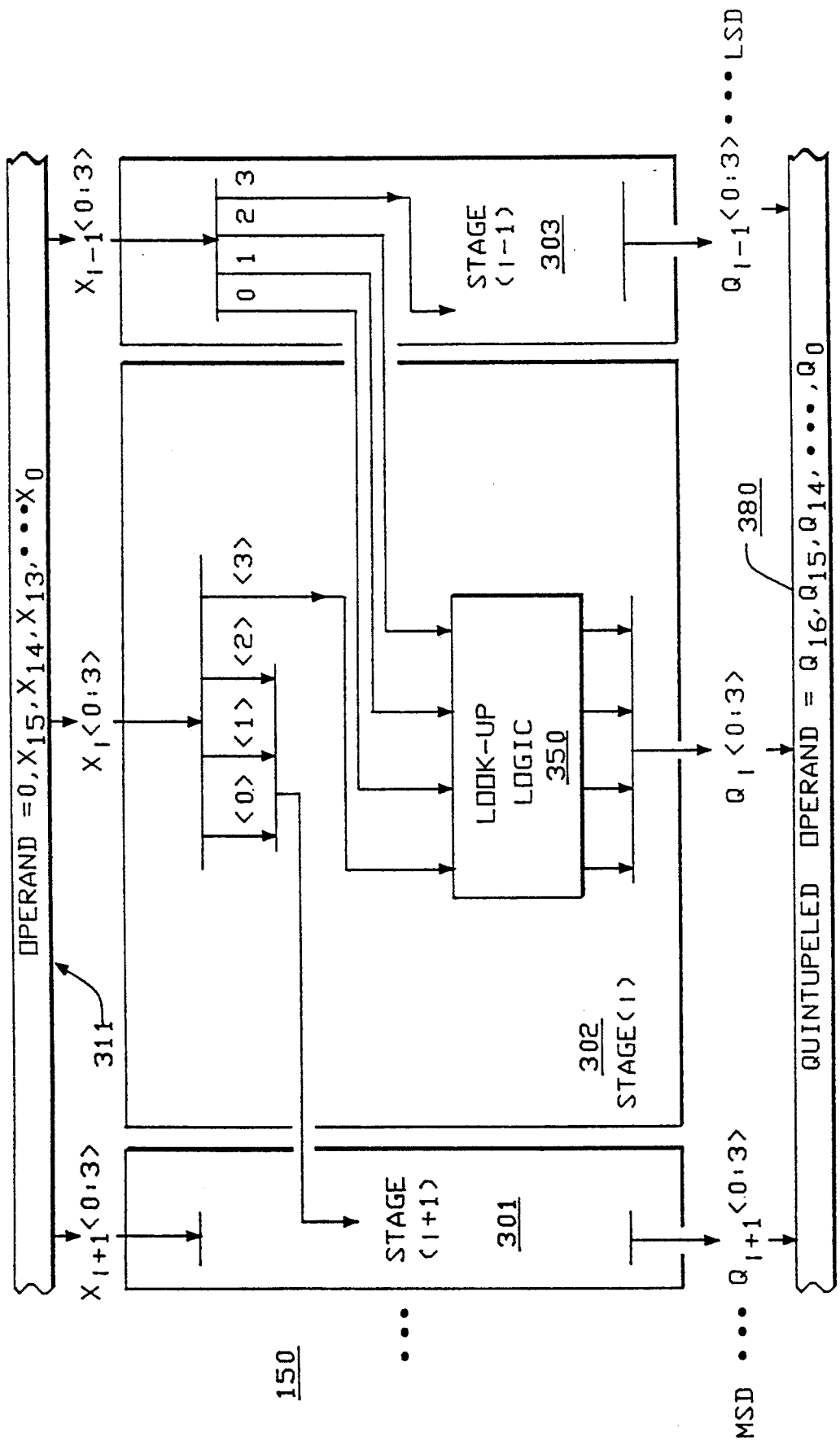
FIG.—3

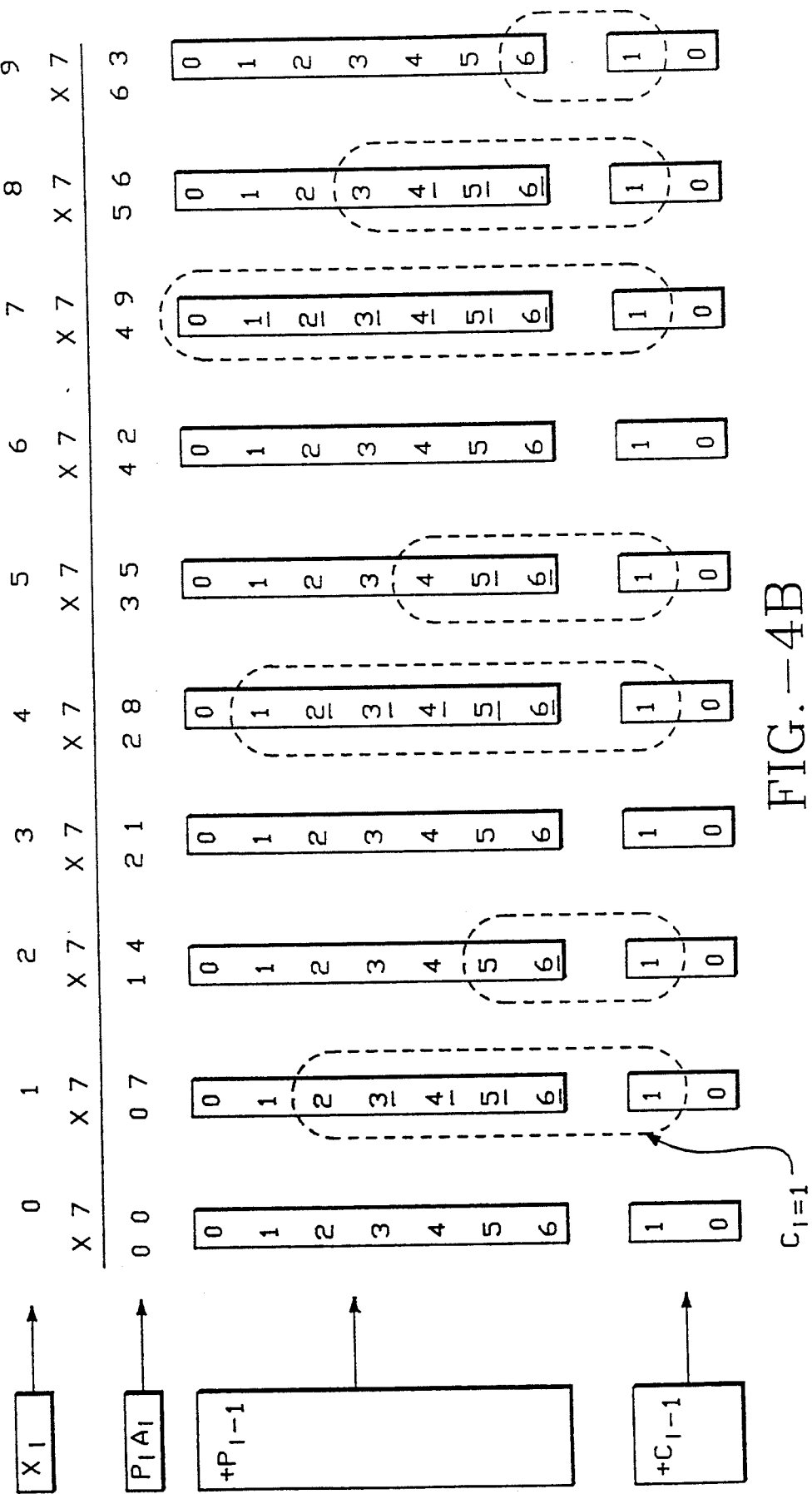
FIG.—4B

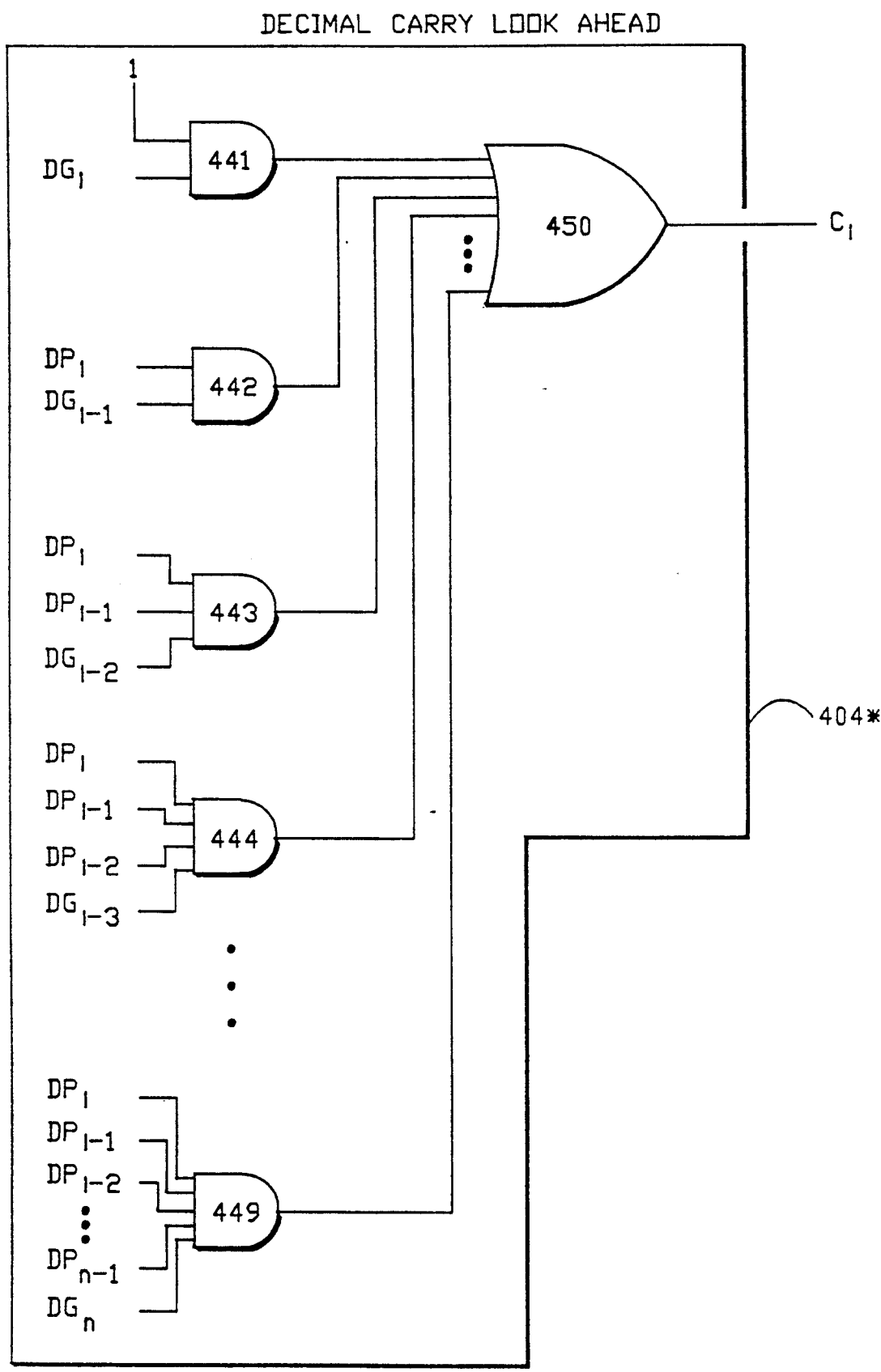
FIG.—4D

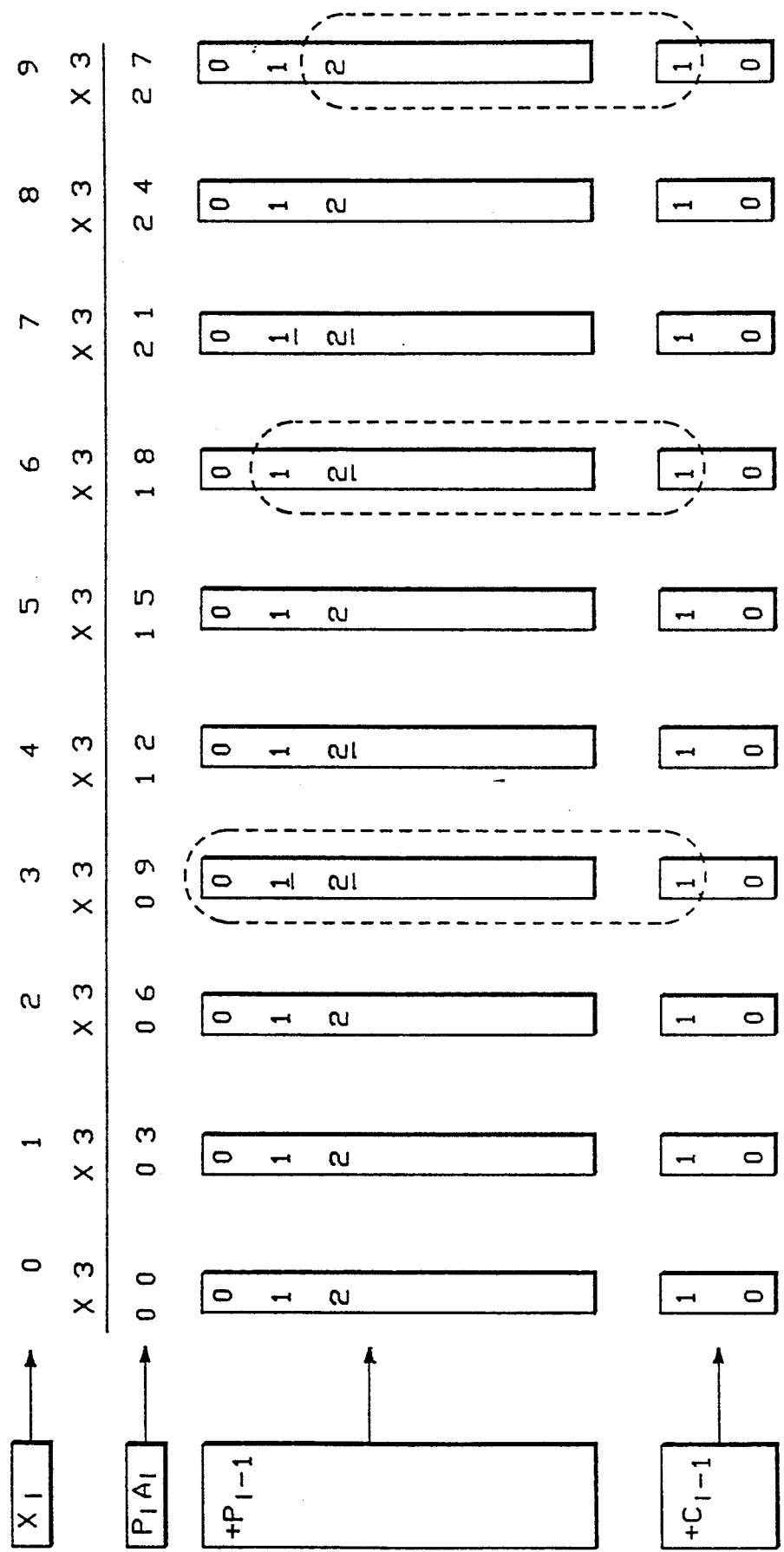
FIG.—5A

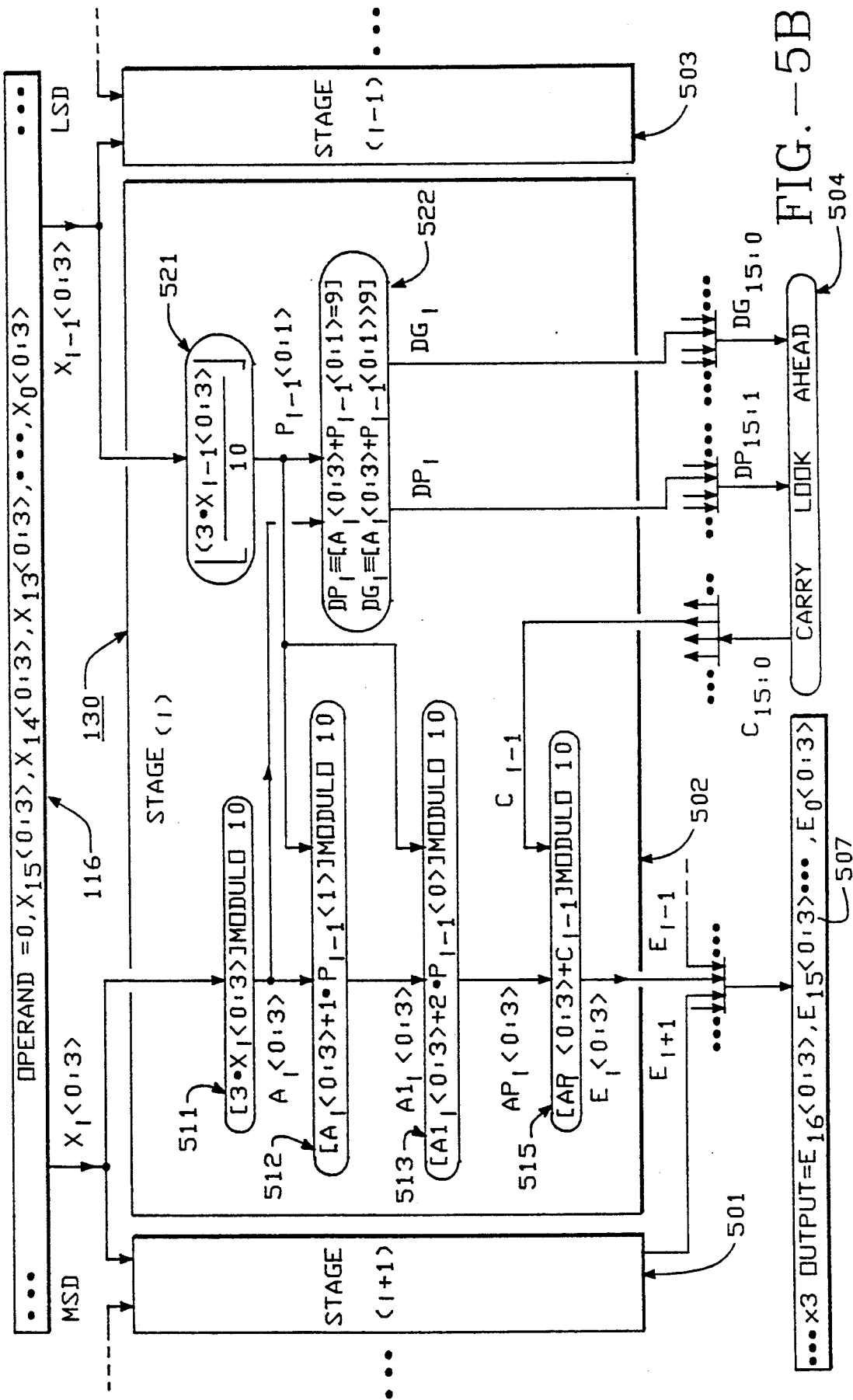
FIG.—5B

METHOD AND APPARATUS FOR GENERATING MULTIPLES OF BCD NUMBER

BACKGROUND

1. Field of the Invention

The invention is directed to a method and apparatus for generating multiples of a BCD (Binary Coded Decimal) number in a high speed digital computer.

1a. Cross Reference to Related Patents

The following U.S. patent(s) is/are assigned to the assignee of the present application, is/are related to the present application and its/their disclosures is/are incorporated herein by reference:

(A) U.S. Pat. No. 4,817,048 issued Mar. 28, 1989 to Rawlinson et al and entitled, DIVIDER WITH QUOTIENT DIGIT PREDICTION.

2. Description of the Related Art

Computations may be carried out within a computer under a variety of number coding systems, including a simple binary coded (SBC) system and a binary coded decimal (BCD) system.

In a simple binary coded (SBC) numbering system, the numbers zero through fifteen are represented by the 4-bit code series, 0000, 0001, 0010, ..., 1110, 1111.

In the binary coded decimal (BCD) numbering system, the decimal digits, zero through nine, are similarly represented by the 4-bit code series, 0000, 0001, 0010, 1000, 1001. But the remaining 4-bit codes, 1010 through 1111, have no numerical meaning. Numbers in the range ten through fifteen are represented by two 4-bit codes (two digits), as are all further numbers up to ninety-nine.

The simple binary coded (SBC) numbering system is generally preferred for carrying out arithmetic computations. This is so because there is an almost natural transformation as one moves from the functions of basic digital circuit components to basic arithmetic operations in the SBC system. The logic exclusive-OR gate, for example, inherently performs a two bit addition in the SBC system. The logic AND gate inherently performs a two-bit multiplication in the SBC system. And the binary SHIFT means inherently performs divide-by-two and multiply-by-two operations on SBC numbers of all bit lengths.

Such is not the case for numbers represented within the binary coded decimal (BCD) numbering system. A one-bit shift-left operation on, for example, a binary coded decimal six (represented by the bit series: 0000 0110) does not produce a binary coded decimal twelve (represented by the bit series: 0001 0010). Instead, it produces a bit series (0000 1100) which has no meaning in the domain of binary coded decimal numbers.

Similarly, a one-bit shift-right operation on a binary coded decimal twelve (represented by the bit series 0001 0010) does not produce a BCD six but rather a bit series (0000 1001) which represents the digits "09" in the BCD numbering system.

A different and more complex set of bit-manipulation rules have to be followed within a digital computer for performing arithmetic operations such as addition, subtraction, multiplication and division in the binary coded decimal (BCD) system as opposed to doing the same in the SBC system.

Despite these difficulties, there are instances where it is advantageous to carry out arithmetic computations directly on BCD numbers, without transforming the BCD numbers into simple binary coded numbers. By way of example, a financial institution may have voluminous amounts of data stored in BCD format. The processing of such data may take too long if back and forth transformations from the BCD system to the simple binary coded system have to be performed for each record.

When multiplication and division operations are to be carried out directly on BCD formatted numbers, it is advantageous to be able to quickly generate signals representing the one-times ($\times 1$) through nine-times ($\times 9$) multiples of every multi-digit BCD (Binary Coded Decimal) number that can be represented by a predefined number of bits (e.g. 64 bits).

If a first BCD number (multiplicand) is to be multiplied by a second BCD number (multiplier), the final product is typically generated by adding shifted multiples of the multiplicand. These multiples are commonly referred to as "partial products." Each partial product is equal to the product of the multiplicand and a corresponding single digit within the multiplier.

In decimal division, each digit of the quotient is typically formed by testing for a negative result while subtracting consecutive multiples of the divisor from a partial remainder. The final quotient digit is the one corresponding to the last tried multiple before the subtraction result becomes negative.

Previous approaches to generating multiples of a BCD multiplicand or of a BCD divisor consume either excessive amounts of computer time or excessive amounts of circuit space.

Generating the $\times 0$ and $\times 1$ multiples of a BCD number is trivial, but the remaining $\times 2$ (time two) through $\times 9$ (times nine) multiples present a problem.

Consider what happens, if a brute force method is used for generating all the $\times 2$ to $\times 9$ multiples of a multi-digit BCD number.

The contemplated brute force method uses a BCD adder having two inputs and an output. A BCD adder, incidentally, is a device which outputs a binary-coded decimal signal representing a sum when respective first and second BCD input signals are applied to its inputs. When speed is important, the BCD adder is typically implemented by using purely combinatorial logic circuits (e.g., AND and OR gates) as opposed to synchronous logic circuits (e.g., flip flops).

In the brute force method, a first register (operand register) is coupled to one input of the BCD adder while a second register (accumulator) is coupled to the other input. A synchronous feedback circuit is provided for writing, into the accumulator, a result output by the BCD adder in a previous machine cycle.

In a first machine cycle, the BCD number is written into the first and second registers (operand and accumulator registers). The number in the second register (accumulator) represents the times-one multiple of the original BCD number.

During a following, second machine cycle, the values in first and second registers are summed by the BCD adder and the result is written back into the second register (accumulator). Now, the number in the accumulator represents the times-two multiple of the original BCD number.

A times-three multiple forms in the accumulator at the end of the third machine cycle. A times-four multiple forms at the end of the fourth cycle, and so on.

Generally speaking, an accumulated sum representing the n-th multiple of the original BCD number forms in the accumulator after machine cycles (n=1,2,...,9) A loop counter is typically included in the mechanism to help automate the procedure. The loop counter is initially loaded with the value, n, and it is decremented for each machine cycle until a zero count is reached. The zero count indicates the point in time when a desired multiple has been formed in the accumulator.

The obvious problem with this brute force approach is that it can take as many as 9 machine cycles just to generate a signal representing one multiple of a multi-digit BCD number. This is considered excessive.

A less obvious problem of the brute force method is that the resources of the BCD adder and three registers are disadvantageously tied up for as many as 9 cycles per multiple. The first tied-up register is the operand register which stores the original BCD number. The second tied-up register is the accumulator which is necessary for storing the result. And the third tied-up register is the loop counter which is required for maintaining the multiple count, n. These resources are unavailable for implementing other machine processes while they are tied up.

A more sophisticated approach shortens computation time by realizing that a ×4 multiple can be generated in just two cycles if the ×2 multiple generated in the first cycle is applied to both the first and second inputs of the BCD adder in the second cycle. The ×8 multiple can be produced in a third cycle by again applying the accumulated result (the ×4 multiple) simultaneously to the first and second inputs of the adder.

Alternatively, a ×5 multiple can be produced in the third cycle after a ×4 multiple has been formed in the second cycle, by re-applying the original BCD number to the first input of the BCD adder while the accumulated result (the ×4 multiple) is applied to the second input. The ×7 multiple can be produced by forming the ×5 multiple in the accumulator and then adding the original BCD number two more times as indicated by: ×5+×1+×2 (5 cycles).

The difficulty with the second approach is that, when a multiplier of fairly large size (e.g., 16 digits) appears in a decimal multiplication operation, it still takes a considerable number of machine cycles (e.g. as many as five cycles) per multiplier digit to form the desired multiples (e.g., the ×5 and the ×7 multiples) of the multiplicand. The total time for carrying out multiplications and divisions is still considered excessively long.

A third approach, which has been used recently in high performance machines such as the Amdahl 5990 mainframe, prestores the ×3 and ×4 multiples in side registers before a multiplication routine begins and then draws on these prestored values to more quickly generate the ×5, ×6, ×7 and ×8 multiples (×5=×4+×1; ×6=×3+×3; ×7=×3+×4; ×8=×4+'4; ×9=×3+×3+×3).

A major drawback of the third approach is that it consumes more registers and still requires as many as three cycles per multiplier digit.

SUMMARY OF THE INVENTION

The invention overcomes the above-mentioned problems by providing a method and apparatus which more quickly produces plural ones of the times-two trough times-nine multiples of a supplied BCD number. The method uses one machine cycle for performing a set-up operation and thereafter just one further machine cycle for producing signals representing each of the times-one through times-nine multiples of a supplied BCD number.

A multiples generating circuit in accordance with the invention comprises:

(a) an operand-storing register (OSR);

(b) a multiple-storing register (MSR);

(c) a multiplexer having a first input coupled to the output of the operand-storing register (OSR) and a second input coupled to the output of the multiple-storing register (MSR);

(d) a ×3 combinatorial unit having an input coupled to the output of the multiplexer and an output coupled to the input of the MSR;

(e) a first ×2 combinatorial unit having an input coupled to the output of the OSR;

(f) a second ×2 combinatorial unit having an input (g) a third ×2 combinatorial unit having an input coupled to the output of the second ×2 unit;

(h) a fourth ×2 combinatorial unit having an input coupled to the output of the MSR;

(i) a ×5 combinatorial unit having an input coupled to the output of the OSR; and (j) a ×7 combinatorial unit having an input coupled to the output of the OSR.

A method in accordance with the invention comprises: switching the multiplexer to a first setting in a set-up cycle to transfer an operand value from the OSR through the ×3 unit and thereby load a ×3 multiple into the MSR, and then switching the multiplexer to a second setting in a subsequent cycle to transfer the loaded ×3 value from the MSR through the ×3 unit to thereby produce a ×9 multiple out of the ×3 unit and to transfer the loaded ×3 value from the MSR through the fourth ×2 unit to thereby produce a ×6 multiple out of the fourth ×2 unit.

The ×1 multiple is derived directly from the output of the OSR. The ×2 multiple is derived from the output of the first ×2 unit. The ×3 multiple is derived from the output of the MSR after the set-up cycle. The ×4 multiple is derived from the output of the second ×2 unit. The ×5 multiple is derived from the output of the ×5 unit. The ×6 multiple is derived from the output of the fourth ×2 unit after the set-up cycle. The ×7 multiple is derived from the output of the ×7 unit. The ×8 multiple is derived from the output of the third ×2 unit. And the ×9 multiple is derived from the output of the ×3 unit after the set-up cycle.

The ×2, ×3, ×5 and ×7 combinatorial units preferably have specialized structures, as disclosed in more detail below, which allow them to produce their respective multiples within the time span of one or two predefined clock periods.

It is worthy to note that the above-summarized apparatus and method do not require the resources of a BCD adder and that they use just two registers to generate the times-one through times-nine multiples of a supplied BCD number.

BRIEF DESCRIPTION OF THE DRAWINGS

The below detailed description makes reference to the accompanying drawings, in which:

FIG. 3 illustrates a preferred structure for the ×5 unit;

FIGS. 4A–4D define a preferred structure for the ×7 unit;

FIG. 5A–5B define a preferred structure for the ×3 unit;

DETAILED DESCRIPTION

Figure 1:
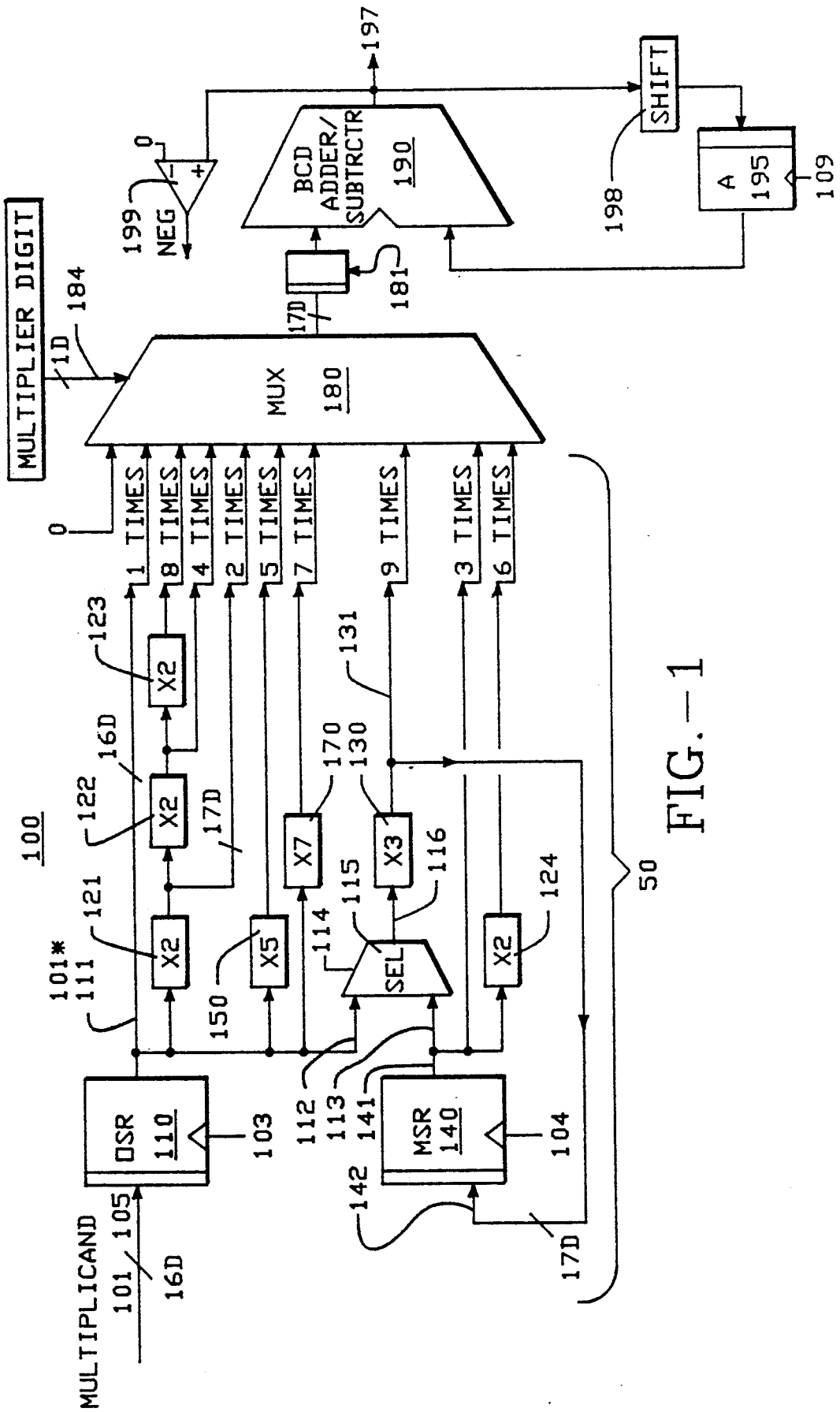
FIG. 1 is a block diagram of a multiplier which includes a multiple generating circuit in accordance with the invention.

FIG. 1 shows a BCD arithmetic unit 100 which includes a multiples generating circuit 50 in accordance with the invention.

For convenience, we define an original BCD number whose multiple(s) are to be formed, as being represented by an "operand" signal, and we represent such an operand signal with the notation "$X_{M:L}$". Within the notation, "L" represents a number assigned to the least significant digit of operand signal $X_{M:L}$ and "M" represents a number assigned to the most significant digit.

For the sake of example, we assume an operand signal $X_{0:15}$ having a 16-digit binary coded decimal field where each digit is represented by four bits. The operand signal is therefore 64 bits long. The digits of the operand signal are numbered 0 to 15, the latter being the most significant digit (MSD).

The four bits of each operand digit are numbered 0 to 3, the latter being the least significant bit (LSB).

The notation "$X_d<b>$" is used here to represent bit number b of digit number d in operand field, X.

The notation "$X_d<0:3>$" is used here to represent all four bits (bit numbers 0 through 3) of digit number d in operand field, X.

The notation "16D-wide" is used here as a descriptor of parallel buses which have the capacity to carry signals representing sixteen-digit wide binary-coded decimal numbers and also for the signals representing such 16-digit wide BCD numbers. Likewise, the notation "17D-wide" is associated herein with signals or busses which have capacity for handling at least seventeen-digit wide BCD numbers.

The multiples-generating circuit 50 of FIG. 1 includes a 64-bit wide (16D-wide) operand-storing register (OSR) 110. OSR 110 has a 64-bit wide parallel input port for receiving an externally supplied 16D-wide BCD operand signal 101 from a 64-bit wide input bus 105.

Operand-storing register (OSR) 110 stores the supplied 16D-wide operand signal 101 upon receipt of an initial strobe pulse 103 from a system clock control unit (not shown).

A 64-bit wide (16D-wide) output bus 111 extends from a 64-bit wide parallel output port of the OSR 110 to deliver a prestored operand signal 101*, which has been prestored in the OSR 110, to a first input port 112 of a mode-selecting multiplexer, 115 (labelled "SEL" in FIG. 1).

The multiples-generating circuit 50 further includes a multiple-storing register (MSR) 140 for storing a signal representing a 17-digit BCD value. As a general rule, MSR 140 should be large enough to store at least 66 bits because a value equal to three times that of the operand signal 101* will be loaded into it. Multiplication by three generally means that the result will be two bits wider than the original operand.

In some embodiments, software limits the value of the prestored operand signal 101* to 15 digits or less, in which case, the MSR 140 storage capacity can be 16 digits or less wide and yet store any 1 through 9 multiple of the original operand signal 101*. By way of example, according to the IBM 390/ESA standard, BCD results are limited to modulo $10^{16}$, meaning that results are never more than 16 digits wide. It will be understood below that narrower (e.g., 16-digit wide) buses and/or registers may be substituted for the below recited 17D-wide buses/registers where software allows. It will, of course, also be understood that wider buses/registers are contemplated and the below description is merely illustrative of the invention.

A 66-bit wide (17D-wide) output bus 141 of the multiple-storing register (MSR) 140 drives a second input port 113 of the mode-selecting multiplexer (SEL) 115.

Output port 116 of multiplexer 115 drives the input side of a ×3 (times-three) combinatorial unit 130. Output port 131 of the ×3 unit couples to an input port 142 of the MSR 140.

Control line 114 is driven by a control unit (not shown) to selectively switch the mode-selecting multiplexer 115 to couple its first input port (112) to its output port 116 in a first mode and to couple its second input port (113) to its output port 116 in a second mode.

At the beginning of a first clock cycle (occurring at or after the application of strobe pulse 103), the multiplexer (SEL) 115 is switched into its first mode. This couples the operand signal 101* presented at its first input port 112, during the first clock cycle, to the input of the ×3 unit 130.

By the end of the first clock cycle, the ×3 unit 130 outputs a BCD signal representing three times the value of the originally supplied operand signal 101*. A preferred internal structure for the ×3 unit 130 will be discussed later in conjunction with FIG. 5.

When a next clock cycle begins, the control unit (not shown) applies a second strobe pulse 104 to MSR 104. MSR 140 captures and stores the times-three value output by the ×3 unit 130 at the end of the first clock cycle. Multiplexer 115 is simultaneously switched to couple its second input port 113 to the input of the ×3 unit 130.

By the end of the second clock cycle, the ×3 unit 130 outputs a 17D-wide BCD signal from its output port 131 representing a BCD value equal to nine times that of the originally supplied operand signal 101*. MSR 140 outputs a 17D-wide BCD signal representing a BCD value equal to three times that of the originally supplied operand signal 101*.

Circuit 50 further includes first through fourth doubler (×2) units 121-124. Each ×2 unit has combinatorial logic circuitry for producing a 17-digit wide BCD signal representing a number equal to two-times the number represented by a 16D-wide or 17D-wide BCD signal applied at its input.

The signal propagation time of each of the first through third ×2 units (121-123) should be less than one third the duration of two system clock cycles. The signal propagation time of the fourth ×2 unit (124) should be less than the duration of one system clock cycle. If desired, the fourth ×2 unit, 124, can use the same circuit design as used for meeting the more stringent propagation requirements of the first through third ×2 units (121-123). Note that the output of each of the first through third ×2 units (121-123) must become valid within two-thirds of a cycle while the output of the fourth ×2 unit has the time of almost a full machine cycle to become valid. (The output of ×2 unit 124 passes through multiplexer 180 and is latched into resynchronization register 181 at the end of machine cycle two.)

The first ×2 combinatorial unit 121 has a 16D-wide input port coupled to the output 111 of the OSR 110.

The second ×2 unit 122 has a 17D-wide input port coupled to the output of the first ×2 unit 121. The third ×2 unit 123 has a 17D-wide input port coupled to the output of the second ×2 unit 122. The fourth ×2 unit 124 has a 17D-wide input port coupled to the 17D-wide output port 141 of the MSR 140.

Just before the end of the second clock cycle, the first three ×2 units 121–123 respectively output signals representing BCD numbers equal to two, four and eight times that of the originally supplied operand signal 101*. A selected one of these output signals passes through multiplexer 180 and is latched into resynchronization register 181 at the end of the second clock cycle.

Just before the end of the second clock cycle, the fourth ×2 unit 124 outputs a signal representing a BCD number equal to twice that of the signal stored in MSR 140 or six times that of the originally supplied operand signal 101*. As already mentioned, the six times output signal propagates through multiplexer 180 (when selected by control signal 184) and it is latched into resynchronization latch 181 at the end of the second clock cycle.

Circuit 50 further comprises a ×5 combinatorial unit (quintupler unit) 150 having a 16D-wide input coupled to the output 111 of the OSR 110 and a 17D-wide output for producing a BCD signal representing a number equal to five times that of the originally supplied operand signal 101*. The signal propagation time of ×5 unit 150 should be less than the duration of two clock cycles.

Circuit 50 also comprises a ×7 combinatorial unit (septupler unit) 170 having a 16D-wide input coupled to the output of the OSR and a 17D-wide output for producing a BCD signal representing a number equal to seven times that of the originally supplied operand signal 101*. The signal propagation time of ×7 unit 170 should be less than the duration of two clock cycles.

Multiple selector 180 receives the ×1 through ×9 multiples represented by the 1-times through 9-times signals output by multiples generating circuit 50. Multiple selector 180 further receives a times zero input as shown. It should be apparent that the signal propagation times for the ×2, ×3, ×5 and ×7 units can be somewhat relaxed if resynchronization registers are provided at the input side of multiple selector 180 in place of the resynchronization register 181 provided at the output side of multiple selector 180. Such a modification would consume more circuit space, however, and this may be disadvantageous in some applications.

After waiting one cycle for the times-three value to set up in the multiple storing register (MSR) 140, and for the 1-times through 9-times output signals to become valid, a series of 1D-wide (4-bits wide) multiple-selecting codes 184 are sequentially applied, one clock cycle after the next, to selector 180 for selecting and outputting a desired one of the ×1 through ×9 multiples to resynchronization register 181. Resynchronization register 181 then presents its latched output to a first input port of a BCD adder/subtractor unit 190 for processing in the subsequent series of clock cycles. Unit 190 is a combinatorial logic circuit which performs a BCD addition or subtraction operation within one clock cycle.

A second input port of BCD adder/subtractor unit 190 receives a previously accumulated value from an output side of accumulating (A) register 195. The input of A-register 195 couples to the output 197 of adder/subtractor 190 by way of digit shifter 198. The A-register 195 is used for storing partial product subtotals during BCD multiply operations and residue values during BCD divide operations. Clock signals 109 strobe the A-register 195 in synchronism with respectively supplied clock signals (not shown) which time the delivery of multiplier digits 184 to multiple selector 180.

Digit shifter 198 selectively performs a 4-bit shift (right or left) operation or a no-shift operation as commanded by the control unit (not shown) to thereby effect a divide-by ten or multiply-by ten or multiply-by one operation on BCD numbers passing through it.

High speed decimal multiplication is realized by supplying the successive digits of a BCD multiplier as the selector codes 184 to selector 180 on every cycle following the initial set-up cycle. Shifter 198 shifts the output 197 of the adder/subtractor 190 one digit right relative to the next multiple output by multiplexer 180 in each successive clock cycle, and thereby in effect, multiplies each next output of multiplexer 180 by ten relative to the value stored in the accumulator (A) 195.

High speed decimal division is realized by supplying progressively larger quotient digits as the selector codes 184 to selector 180 on every cycle following set-up. Accumulator 195 stores the partial remainder generated in a previous divide iteration and minus-detector 199 signals when a next result goes negative. A quotient estimating operation as disclosed in the above cited U.S. Pat. No. 4,817,048, entitled, DIVIDER WITH QUOTIENT DIGIT PREDICTION is preferably used to select the first tested quotient digit. The predicted value is relatively close to the final result (as close as possible without going over). Quotient prediction reduces the number of cycles necessary for carrying out decimal division on BCD numbers.

Figure 2:
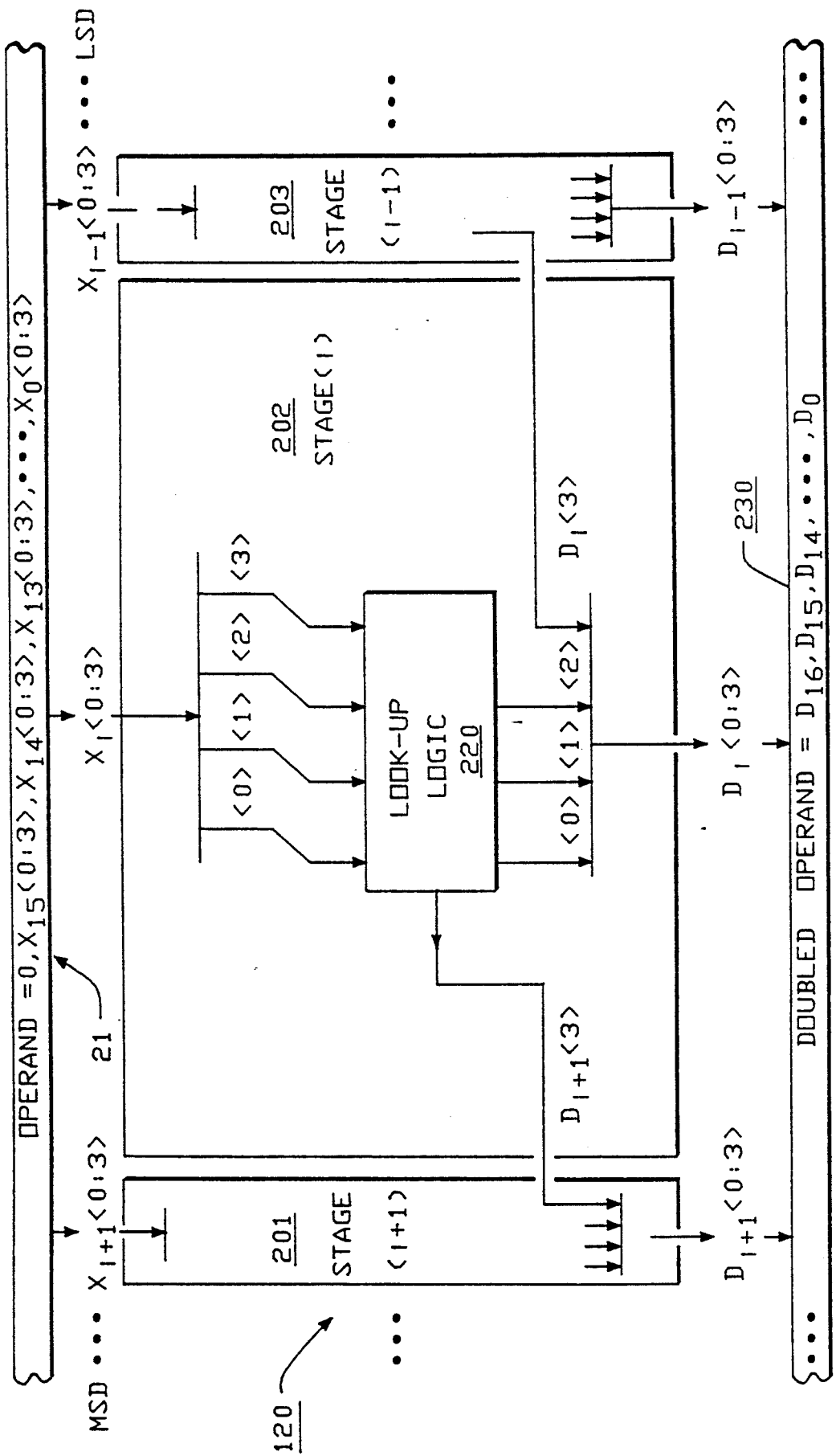
FIG. 2 illustrates a preferred structure for the ×2 unit.

Referring to FIG. 2, a preferred internal structure for each doubler unit (×2 unit) 121–124 is schematically shown at 120. A plurality of parallel doubler stages are provided within unit 120 and interconnected as shown. Incidentally, in the below discussions, each ×2 unit is also referred to as a "doubler" unit, the ×3 unit 130 is referred to as a "tripler" unit, the ×5 unit 150 is referred to as a "quintupler" unit, and the ×7 unit 170 is referred to as a "septupler" unit.

Each doubler STAGE$_i$ (e.g., 202) receives operand input bits X$_i$<0:3> and produces a corresponding output digit D$_i$<0:3>. STAGE$_i$ 202 also receives and directly outputs an output bit D$_i$<3> from a look-up logic circuit 220 in a previous stage STAGE$_{i-1}$ (e.g., 203) as shown.

The underlying theory of operation for doubler circuit 120 arises from two simple observations.

First, it is observed that when a single BCD digit is doubled, the result is always even. This means that the least significant bit in the resulting digit is always zero.

Second, it is observed that when a single BCD digit is doubled, its overflow is either a single-bit zero or a single-bit one.

Since the least significant bit of a doubled digit is always zero and the overflow from a less significant, adjacent digit is always a one or zero, no addition is required for generating the least significant bit in the second digit of a result produced by doubling a supplied two-digit BCD number. The overflow from doubling the lesser significant digit of the supplied number is simply written into the least significant bit position of the more significant result-digit.

As shown in FIG. 2, look-up logic circuit 220 receives operand bits X$_i$<0:3> and produces therefrom result bits $D_i<0:2>$ and $D_{i+1}<3>$. The input versus output truth table for look-up logic circuit 220 is shown in below Table X2.1. The dashes indicate don't care outputs corresponding to input states which do not occur in the BCD format. Look-up logic 220 may be implemented with two levels of AND/NOR gates or the like.

TABLE X2.1

| INPUTS | OUTPUTS | |
|---|---|---|
| $X<0:3>$ | $D_{i+1}<3>$ | $D<0:2>$ |
| 0000 | 0 | 000 |
| 0001 | 0 | 001 |
| 0010 | 0 | 010 |
| 0011 | 0 | 011 |
| 0100 | 0 | 100 |
| 0101 | 1 | 000 |
| 0110 | 1 | 001 |
| 0111 | 1 | 010 |
| 1000 | 1 | 011 |
| 1001 | 1 | 100 |
| 1010 | — | — |
| 1011 | — | — |
| 1100 | — | — |
| 1101 | — | — |
| 1110 | — | — |
| 1111 | — | — |

Referring to FIG. 3, a schematic of the preferred internal structure for quintupler (X5) unit 150 is shown. Plural stages are provided, e.g., STAGE (i+1), STAGE(i), STAGE(i−1), as shown respectively at 301, 302 and 303 for producing corresponding digits $Q_{i+1}<0:3>$, $Q_i<0:3>$, $Q_{i-1}<0:3>$ of the resulting output signal 380.

The resulting signal 380 is illustrated as a quintupled operand comprising digits $Q_{16}$, $Q_{15}$, $Q_{14}$, . . . $Q_0$, the latter being the least significant digit.

Similarly, the input operand is shown at 311 as comprising digits 0, $X_{15}$, $X_{14}$, $X_{13}$, . . . $X_0$, the latter being, again, the least significant digit and the leading zero being provided in the operand for producing corresponding output digit $Q_{16}$.

With regard to the theory of operation behind the production of a times-five multiple of a BCD input signal, it is noted that a mathematically equivalent operation could be provided through multiplying by ten and dividing by two.

A multiply by ten operation is performed in the BCD domain simply by shifting left four bit positions. If one shifts a BCD coded number right by one bit position, that is almost equivalent to dividing by two, but not quite. Some additional logic is required to take care of residual effects.

As seen in FIG. 3, the overall operation of quintupler 150 is to provide a shift left by three bit positions (which is equivalent to shifting left by four positions and then shifting back right by one position). Look-up logic unit 350 receives the least significant bit $X_i<3>$ of operand digit $X_i$ and the three more significant bits $X_{i-1}<0:2>$ of the next-adjacent, less significant digit $X_{i-1}$.

The below table X5.1 is a Boolean logic truth table for the operations performed by look-up logic 350. Dashes in the table indicate don't care conditions for code combinations which do not occur in the BCD format. This logic can be implemented with two levels of AND/NOR gates or the like and is therefore relatively fast.

TABLE X5.1

| INPUTS | | OUTPUTS |
|---|---|---|
| $X_i<3>$ | $X_{i-1}<0:2>$ | $Q_i<0:3>$ |
| 0 | 000 | 0000 |
| 0 | 001 | 0001 |
| 0 | 010 | 0010 |
| 0 | 011 | 0011 |
| 0 | 100 | 0100 |
| 0 | 101 | — |
| 0 | 110 | — |
| 0 | 111 | — |
| 1 | 000 | 0101 |
| 1 | 001 | 0110 |
| 1 | 010 | 0111 |
| 1 | 011 | 1000 |
| 1 | 100 | 1001 |
| 1 | 101 | — |
| 1 | 110 | — |
| 1 | 111 | — |

Figure 4A:
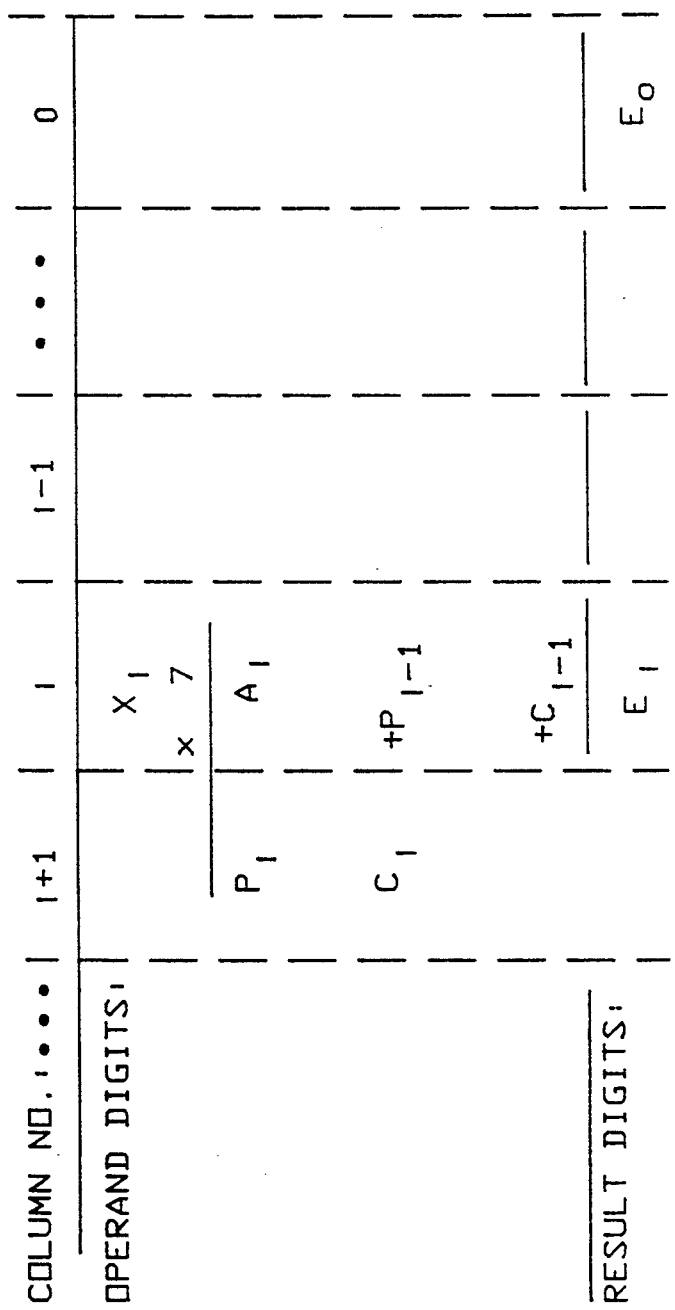
Figure 4C:
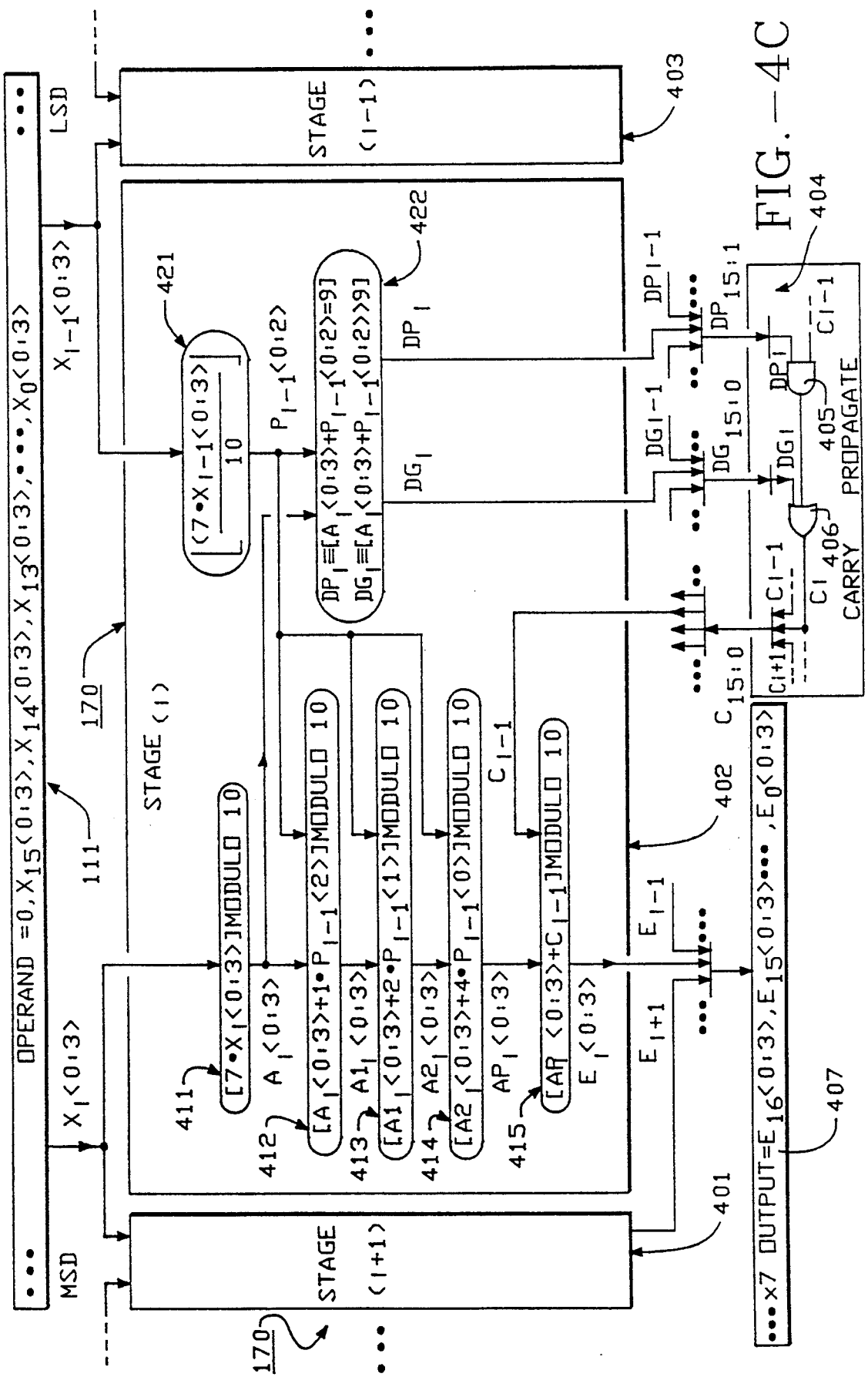

The preferred internal structure of the septupler (X7) unit 170 is illustrated in FIG. 4C. This structure is best appreciated by first referring to FIG. 4A.

FIG. 4A illustrates a multi-column table which separates out the operations that take place when a digit $X_i$ in column number "i" is multiplied by seven in conjunction with other digits in columns i−1 and i+1. The immediate result of seven·Xi is to place a first answer digit, $A_i$, in column number "i"; and if the product seven·$X_i$ produces a two-digit answer, then we insert a primary contribution $P_i$ into the next significant column, i+1. This concept is more plainly seen by referring briefly to the top half of FIG. 4B. $X_i$ is the single digit that is multiplied by seven. $P_iA_i$ is a two-digit result produced when this multiplication is considered in isolation.

Referring still to FIG. 4A, when multiplication is not carried out on one digit in isolation, we must consider the possibility that a primary contribution, +$P_{i-1}$ will be placed into column number "i" (as below digit $A_i$) due to a similar operation occurring in the immediately less significant column, i−1.

The sum, $A_i+P_{i-1}$, could generate an additional carry factor which contributes to the next higher column, i+1, if the sum $A_i+P_{i-1}$ is greater than nine. Similarly, a further carry contribution, +$C_{i-1}$, could have been introduced into column i because of a corresponding operation in the preceding column, i−1. So actually, it is the sum, $A_i+P_{i-1}+C_{i-1}$, which can produce a carry, $C_i$, in next succeeding column, i+1.

The resulting end digit, $E_i$, placed into column i is the modulo-ten residue of the sum, $A_i+P_{i-1}+C_{i-1}$.

Referring to FIG. 4B, all possible combinations of the multiply operation that was generically shown in FIG. 4A, are now distributed across the page. The possible values for the primary contribution factor +$P_{i-1}$ are the same as the leading digits in the row marked $P_iA_i$. These potential contributions are repeated vertically, for each case of $X_i$ times seven, in the horizontal region marked +$P_{i-1}$. Basically, each of $P_i$ and $P_{i-1}$ can be a digit selected from the range zero to six.

The possible contribution from the carry factor +$C_{i-1}$ is similarly shown in the horizontal region marked +$C_{i-1}$. This factor can be either a one or a zero.

Dashed circles are drawn around the cases where, $C_{i-1}=1$ and the sum $A_i+P_{i-1}C_{i-1}$ is greater This produces a carry factor $C_i$ for the next column equal to one. Additionally, underlines are drawn under those factors $P_{i-1}$ for which a greater than nine sum is produced by $A_i + P_{i-1} + C_{i-1}$ even if $C_{i-1}$ is zero.

Generally speaking, it is seen that: $C_i = 1$

IF $[A_i + P_{i-1} > 9]$

OR

IF $[A_i + P_{i-1} = 9]$ AND $[C_{i-1} = 1]$.

Referring now to FIG. 4C, it is seen that the illustrated stages, 401, 402, 403, etc., are structured to implement the above-described operations. STAGE(i) 402 produces result digit $E_i$.

To do so, STAGE(i) comprises a first logic module 411 which receives the four-bits of digit $X_i$ and produces therefrom a four-bit signal representing the digit value $A_i$.

Simultaneously, logic module 421 receives the four-bits of preceding digit $X_{i-1}$ and produces therefrom a three-bit wide signal representing the value $P_{i-1}$. (The maximum value for $P_{i-1}$ is six, so only three bits are required for representing it.)

Logic module 412 receives the outputs of logic modules 411 and 421 to produce a first four-bit wide output signal, $A1_i$ representing the sum of $A_i$ and the least significant bit of $P_{i-1}$.

Logic module 413 produces a second four-bit wide signal, $A2_i$ which represents the sum of $A1_i$ and the next significant bit of $P_{i-1}$.

Logic module 414 produces a third four-bit wide signal, $AP_i$ which represents the sum of $A2_i$ and the most significant bit of $P_{i-1}$. The resulting four bits $AP_i<0:3>$ consequently represent the four least significant bits of the sum $A_i + P_{i-1}$.

While the output signals of logic modules 411 and 421 propagate through succeeding modules 412 through 414, logic module 422 simultaneously receives the same signals, $A_i<0:3>$ and $P_{i-1}<0:2>$.

Logic module 422 produces two decision signals, $DG_i$ and $DP_i$. Decision signal $DG_i$ is true if the sum $A_i + P_{i-1}$ is greater than nine. Decision signal $DP_i$ is true if the sum $A_i + P_{i-1}$ is equal to nine.

Decision signal $DP_i$ is transmitted to a carry-propagate module 404 where it is ANDed at 405 with a rippled-through signal $C_{i-1}$ to thereby define a signal representing the condition, IF $A_i + P_{i-1} = 9$ AND $C_{i-1} = 1$. This condition signal is then logically ORred at 406 with the other decision signal $DG_i$ to produce the signal $C_i$ for each corresponding STAGE(i).

The carry signal, $C_{i-1}$ which ripples out from that portion of carry-propagate module 404 belonging to STAGE(i−1), enters STAGE(i) and combines in logic module 415 with the output $AP_i$ from logic module 414. Logic module 415 produces the four-bit wide signal $E_i$ which represents the four least significant bits of the sum $AP_i + C_{i-1}$.

Each of logic modules 411–415 and 421–422 is implemented with two levels of AND/NOR gates or the like. The design of these modules is carried out with standard truth-table techniques, well known in the art.

It should be apparent to those skilled in the art that the final output 407 of septupler unit 170 is valid after carry bits ripple through the carry-propagate module 404 from the least significant stage, STAGE(0) through to the most significant stage, STAGE(16).

Referring to FIG. 4D, a more preferred structure for carry generation is shown. The illustrated module 404* is referred to as a carry look-ahead module 404*. Rather than waiting for a carry signal to propagate out from a previous stage, the inputs of carry look-ahead module 404* are coupled directly to the DG and DP outputs of all previous stages and also to the $DG_i$ and $DP_i$ outputs of its corresponding stage (i). It is recognized that a logic one ("1") carry signal $C_i$ should be sent to the next higher stage, stage (i+1) if $DG_i$ is equal to logic one ("1"), OR the output $DP_i$ of the present stage is equal to logic one and the output $DG_{i-1}$ of the previous stage is equal to logic one (if there is such a previous stage), OR where there are further previous stages, $DP_i = 1$ and $DP_{i-1} = 1$ and $DP_{i-2} = 1$ and . . . $DP_{n-1} = 1$ and $DG_n = 1$.

A circuit for carrying out this logic is shown in FIG. 4D. AND gates 441, 442, . . . , 449 respectively perform the AND operation for each possibility. The number of AND gates 441-449 increases as one moves from Stage(0) to Stage(16). Those skilled in the art will recognized that AND gate 441 may be dispensed with and the signal $DG_i$ can be applied directly to OR gate 450. AND gate 441 is shown in FIG. 4D merely to show the development of the rest of the circuit.

FIG. 5A is drawn so as to correspond with the explanations already provided for FIGS. 4A, 4B. FIG. 5A explains the design philosophy of tripler unit 130. Note that the value $P_i$ in the case of the tripler is never greater than two. Accordingly, only two bits are required for representing the value $P_i$.

FIG. 5B illustrates the preferred internal structure for tripler unit 130. Like reference symbols are used in FIG. 5B for elements corresponding to those already described in conjunction with FIG. 4C. Note that the output of logic module 513 feeds directly into logic module 515 because only two bits are required to represent the factor $P_{i-1}$. Note also that module 504 is preferably a carry look-ahead module rather than a carry propagate module.

Referring back to FIG. 1, it is now seen that with the disclosed combinatorial structures for the ×2, ×3, ×5 and ×7 units, it is possible to rapidly generate signals representing the times-two through times-nine multiples of a number represented by a supplied BCD operand signal 101 and that it is possible to do so without tying up the BCD adder 190 or utilizing more than two registers, 110 and 140.

The above disclosure is to be taken as illustrative of the invention, not as limiting its scope or spirit. Numerous modifications and variations will become apparent to those skilled in the art after studying the above disclosure.

By way of example, the multiples generating circuit 50 can be modified to further generate non-prime multiples of BCD numbers such as ×12, ×14, ×15, etc., when so desired, by coupling appropriate ones of the ×2, ×3, ×5 and ×7 modules to the 6-times, 7-times, 5-times, etc. outputs illustrated in FIG. The output of accumulator 195 can be selectively fed back by way of multiplexers (not shown) to the input of either OS 110 and/or MSR 140 so as to provide for cascaded BCD arithmetic operations when desired.

Given the above disclosure of general concepts and specific embodiments, the scope of protection sought is to be defined by the following claims.

What is claimed is:

1. A multiples generating circuit for producing multiples of a supplied operand comprising:

(a) an operand-storing register (OSR) having an input and an output;

(b) a multiple-storing register (MSR) having an input and an output;

(c) a multiplexer having a first input coupled to the output of the operand-storing register (OSR) and a second input coupled to the output of the multiple-storing register (MSR), said multiplexer further including an output for outputting a selected one of first and second signals respectively present at the first and second inputs of the multiplexer;

(d) a times-3 unit ($\times 3$ unit) having an input coupled to the output of the multiplexer and an output coupled to the input of the MSR, where the $\times 3$ unit outputs a signal representing a times-three multiple of the signal presented to the input of the $\times 3$ unit;

(e) a first times-2 unit ($\times 2$ unit) having an input coupled to the output of the OSR, the first $\times 2$ unit also including an output for outputting a signal representing a times-two multiple of a signal presented to the input of the first $\times 2$ unit;

(f) a second times-2 unit ($\times 2$ unit) having an input coupled to the output of the first $\times 2$ unit, the second $\times 2$ unit also including an output for outputting a signal representing a times-two multiple of a signal presented to the input of the second $\times 2$ unit;

(g) a third times-2 unit ($\times 2$ unit) having an input coupled to the output of the second $\times 2$ unit, the third $\times 2$ unit also including an output for outputting a signal representing a times-two multiple of a signal presented to the input of the third $\times 2$ unit;

(h) a fourth times-2 unit ($\times 2$ unit) having an input coupled to the output of the MSR, the fourth $\times 2$ unit also including an output for outputting a signal representing a times-two multiple of a signal presented to the input of the fourth $\times 2$ unit;

(i) a times-5 unit ($\times 5$ unit) having an input coupled to the output of the OSR, the $\times 5$ unit also including an output for outputting a signal representing a times-five multiple of a signal presented to the input of the $\times 5$ unit; and (j) a times-7 unit ($\times 7$ unit) having an input coupled to the output of the OSR, the $\times 7$ unit also including an output for outputting a signal representing a times-seven multiple of a signal presented to the input of the $\times 7$ unit.

2. A multiples generating circuit according to claim 1 wherein the operand-storing register (OSR) stores an operand signal representing a multi-digit binary-coded-decimal (BCD) number and each of the $\times 2$, $\times 3$, $\times 5$ and $\times 7$ units outputs a corresponding BCD signal representing a corresponding multiple of the input signal applied to that unit.

3. A multiples generating circuit according to claim 2 wherein output signals representing at least the times-two, times-four and times-eight multiples of the value represented by the operand signal are to be produced by the end of two predefined clock cycles; and wherein the first through third $\times 2$ units each consists of a combinatorial logic circuit having a signal propagation time equal to or less than one third the duration of the two predefined clock cycles.

4. A multiples generating circuit according to claim 2 wherein an output signal representing at least the times-six multiple of the value represented by the operand signal is to be produced by the end of two predefined, successive clock cycles; and wherein the fourth $\times 2$ unit consists of a combinatorial logic circuit having a signal propagation time equal to or less than the duration of the second one of said two predefined clock cycles.

5. A multiples generating circuit according to claim 2 further comprising a multiple selector coupled to receive: a 1-times signal output from the OSR, a 2-times signal output from the first $\times 2$ unit, a 3-times signal output from the MSR, a 4-times signal output from the second $\times 2$ unit, a 5-times signal output from the $\times 5$ unit, a 6-times signal output from the fourth $\times 2$ unit, a 7-times signal output from the $\times 7$ unit, a 8-times signal output from the third $\times 2$ unit, and a 9-times signal output from the $\times 3$ unit; wherein the multiple selector further receives a multiple selecting signal and outputs a corresponding one of the 1-times through 9-times signals according to the received selecting signal.

6. A BCD (Binary Coded Decimal) doubler circuit comprising a plurality of successive and substantially similar stages, Stage$_{i-1}$, Stage$_i$, Stage$_{i+1}$, where each Stage$_i$ includes:

first through fourth input terminals for receiving first through fourth operand bits, X$_i$<0>, X$_i$<1>, X$_i$<2>, X$_i$<3>, representing an operand digit X$_i$<0:3>;

look-up logic means, coupled to the first through fourth input terminals, for generating three doubled digit bits, D$_i$<0>, D$_i$<1>, D$_i$<2>, representing the three more significant bits of the value:

$$[2 \cdot X_i<0:3>] \text{ modulo } 10,$$

and for generating a carry bit D$_{i+1}$<3> representing the value:

$$[2 \cdot X_i<0:3>/10] \text{ modulo } 10;$$

a fifth input terminal for receiving a carry bit D$_i$<3> from the preceding Stage$_{i-1}$, if any; and first through fourth output terminals for producing first through fourth bits, D$_i$<0>, D$_i$<1>, D$_i$<2>, D$_i$<3>, representing a result digit, D$_i$<0:3>.

7. A BCD (Binary Coded Decimal) quintupler circuit comprising a plurality of successive and substantially similar stages, Stage$_{i-1}$, Stage$_i$, Stage$_{i+1}$, where each Stage$_i$ includes:

first through fourth input terminals for receiving first through fourth operand bits, X$_i$<0>, X$_i$<1>, X$_i$<2>, X$_i$<3>, representing an operand digit X$_i$<0:3>;

look-up logic means, coupled to the first through third input terminals of a preceding Stage$_{i-1}$, if any and further coupled to the fourth input terminal of the current Stage$_i$, for generating four quintupled digit bits, Q$_i$<0>, Q$_i$<1>, Q$_i$<2>, Q$_i$<3>, representing the four bits of the value:

$$[5 \cdot X_i<0:3>] \text{ modulo } 10; \text{ and}$$

first through fourth output terminals for producing first through fourth bits, Q$_i$<0>, Q$_i$<1>, Q$_i$<2>, Q$_i$<3>, representing a result digit, Q$_i$<0:3>.

8. A BCD (Binary Coded Decimal) septupler circuit comprising a plurality of successive and substantially similar stages, Stage$_{i-1}$, Stage$_i$, Stage$_{i+1}$, where each Stage$_i$ includes:

firth through fourth primary input terminals for receiving first through fourth operand bits, $X_i<0>$, $X_i<1>$, $X_i<2>$, $X_i<3>$, representing an operand digit $X_i<0:3>$;

first through fourth secondary input terminals for receiving first through fourth operand bits, $X_{i-1}<0>$, $X_{i-1}<1>$, $X_{i-1}<2>$, $X_{i-1}<3>$, representing an operand digit $X_{i-1}<0:3>$;

a first module, coupled to the primary input terminals for generating four initial answer bits, $A_i<0>$, $A_i<1>$, $A_i<2>$, $A_i<3>$, representing the four bits of the value:

$$[7 \cdot X_i<0:3>] \text{ modulo } 10;$$

a second module, coupled to the secondary input terminals, for generating three primary contribution bits, $P_{i-1}<0>$, $P_{i-1}<1>$, $P_{i-1}<2>$, representing the three significant bits of the value:

$$[7 \cdot X_{i-1}<0:3>/10];$$

a third module, coupled to the outputs $A_i<0:3>$ and $P_{i-1}<0:2>$ of the first and second modules, for generating four intermediate answer bits, $AP_{i-1}<0>$, $AP_{i-1}<1>$, $AP_{i-1}<2>$, $AP_{i-1}<3>$, representing the four significant bits of the value:

$$[A_i<0.3> + P_{i-1}<0.2>] \text{ modulo } 10;$$

a fourth module, coupled to the outputs $A_i<0:3>$ and $P_{i-1}<0:2>$ of the first and second modules, for generating two decision bits, $DG_i$ and $DP_i$ respectively representing the truth of the propositions:

$[A_i<0:3> + P_{i-1}<0:2>]$ is greater than nine, and $[A_i<0:3> + P_{i-1}<0:2>]$ is equal to nine, a fifth module, coupled to receive the decision bits $DG_{i-1}$ and $DP_{i-1}$, of a preceding Stage$_{i-1}$, if any, to produce the carry bit, $C_{i-1}$, according to the logic equation:

$C_{i-1} = DG_{i-1}$ OR $[DP_{i-1}$ AND $C_{i-2}]$; and a sixth module, coupled to receive the carry bit, $C_{1-1}$, produced by the fifth module and the signal $AP_i<0:3>$ produced by the third module, for generating four final answer bits, $E_i<0>$, $E_i<1>$, $E_i<2>$, $E_i<3>$, representing the four significant bits of the value:

$$[AP_i<0:3> + C_{i-1}] \text{ modulo } 10.$$

9. A BCD (Binary Coded Decimal) septupler circuit comprising a plurality of successive and substantially similar stages, Stage$_{i-1}$, Stage$_i$, Stage$_{i+1}$, where each Stage$_i$ includes:

first through fourth primary input terminals for receiving first through fourth operand bits, $X_i<0>$, $X_i<1>$, $X_i<2>$, $X_i<3>$, representing an operand digit $X_i<0:3>$;

first through fourth secondary input terminals for receiving first through fourth operand bits, $X_{i-1}<0>$, $X_{i-1}<1>$, $X_{i-1}<2>$, $X_{i-1}<3>$, representing an operand digit $X_{i-1}<0:3>$;

a first module, coupled to the primary input terminals for generating four initial answer bits, $A_i<0>$, $A_i<1>$, $A_i<2>$, $A_i<3>$, representing the four bits of the value:

$$[7 \cdot X_i<0:3>] \text{ modulo } 10;$$

a second module, coupled to the secondary input terminals, for generating three primary contribution bits, $P_{i-1}<0>$, $P_{i-1}<1>$, $P_{i-1}<2>$, representing the three significant bits of the values:

$$[7 \cdot X_{i-1}<0:3>/10];$$

a third module, coupled to the outputs $A_i<0:3>$ and $P_{i-1}<0:2>$ of the first and second modules, for generating four intermediate answer bits, $AP_{i-1}<0>$, $AP_{i-1}<1>$, $AP_{i-1}<2>$, $AP_{i-1}<3>$, representing the four significant bits of the value:

$$[A_i<0:3> + P_{i-1}<0:2>] \text{ modulo } 10;$$

a fourth module, coupled to the outputs $A_i<0:3>$ and $P_{i-1}<0:2>$ of the first and second modules, for generating two decision bits, $DG_i$ and $DP_i$ respectively representing the truth of the propositions:

$[A_i<0:3> + P_{i-1}<0:2>]$ is greater than nine, and $[A_i<0:3> + P_{i-1}<0:2>]$ is equal to nine, a fifth module, coupled to receive the decision bits $DG_{j-1}$ and $DP_{j-1}$, of each preceding Stage$_j$, if any, and also $DG_i$ and $DP_i$ of its own Stage$_i$, to produce the carry bit, $C_i$, according to the logic equation:

$C_i = DG_i$ OR $[DP_i$ AND $DG_{i-1}]$ OR $[DP_i$ AND $DP_{i-1}$ AND $DP_{i-2}]$ OR ... $[DP_i$ AND $DP_{i-1}$ AND ... $DP_{n-1}$ AND $DG_n]$; and a sixth module, coupled to receive the carry bit, $C_{i-1}$, produced by the fifth module and the signal $AP_i<0:3>$ produced by the third module, for generating four final answer bits, $E_i<0>$, $E_i<1>$, $E_i<2>$, $E_i<3>$, representing the four significant bits of the value:

$$[AP_i<0:3> + C_{i-1}] \text{ modulo } 10.$$

10. A BCD(Binary Coded Decimal) tripler circuit comprising a plurality of successive and substantially similar stages, Stage$_{i-1}$, Stage$_i$, Stage$_{i+1}$, where each Stage$_i$ includes:

first through fourth primary input terminals for receiving first through fourth operand bits, $X_i<0>$, $X_i<1>$, $X_i<2>$, $X_i<3>$, representing an operand digit $X_i<0:3>$;

first through fourth secondary input terminals for receiving first through fourth operand bits, $X_{i-1}<0>$, $X_{i-1}<1>$, $X_{i-1}<2>$, $X_{i-1}<3>$, representing an operand digit $X_{i-1}<0:3>$;

a first module, coupled to the primary input terminals for generating four initial answer bits, $A_i<0>$, $A_i<1>$, $A_i<2>$, $A_i<3>$, representing the four bits of the value:

$$[3 \cdot X_i<0:3>] \text{ modulo } 10;$$

a second module, coupled to the secondary input terminals, for generating two primary contribution bits, $P_{i-1}<0>$, $P_{i-1}<1>$, representing the two significant bits of the value:

$$[3 \cdot X_{i-1}<0:3>/10];$$

a third module, coupled to the outputs $A_i<0:3>$ and $P_{i-1}<0:1>$ of the first and second modules, for generating four intermediate answer bits, $AP_{i-1}<0>$, $AP_{i-1}<1>$, $AP_{i-1}<2>$, $AP_{i-1}<3>$, representing the four significant bits of the value:

$$[A_i<0:3>+P_{i-1}<0:1>] \text{ modulo } 10;$$

a fourth module, coupled to the outputs $A_i<0:3>$ and $P_{i-1}<0:1>$ of the first and second modules, for generating two decision bits, $DG_i$ and $DP_i$ respectively representing the truth of the propositions:

$$[A_i<0:3>+P_{i-1}<0:1>] \text{ is greater than nine, and}$$

$$[A_i<0:3>+P_{i-1}<0:1>] \text{ is equal to nine,}$$

a fifth module, coupled to receive the decision bits $DG_{i-1}$ and $DP_{i-1}$, of a preceding $Stage_{i-1}$, if any, to produce the carry bit, $C_{i-1}$, according to the logic equation:

$$C_{i-1} = DG_{i-1} \text{ OR } [DP_{i-1} \text{ AND } C_{i-2}]; \text{ and}$$

a sixth module, coupled to receive the carry bit, $C_{i-1}$, produced by the fifth module and the signal $AP_i<0:3>$ produced by the third module, for generating four final answer bits, $E_i<0>$, $E_i<1>$, $E_i<2>$, $E_i<3>$, representing the four significant bits of the value:

$$[AP_i<0:3>+C_{i-1}] \text{ modulo } 10.$$

11. A method for producing BCD (Binary Coded Decimal) signals representing the times-three and times-nine multiples of an operand represented by a supplied operand signal, the method comprising the steps of:

providing a multiple storage register (MSR) and a BCD tripler unit;

applying the operand signal to the tripler unit to produce the times-three signal;

storing the times-three signal in the multiple storage register (MSR); and applying the stored signal to the tripler unit to produce the times-nine signal.

12. A method according to claim 11 for further producing a BCD signal representing the times-six multiple of the operand represented by the supplied operand signal, the method comprising the additional steps of:

providing a BCD doubler unit; and applying the tripled signal stored in the MSR to the BCD doubler unit to produce the times-six signal.

13. A method according to claim 11 for producing BCD (Binary Coded Decimal) signals representing the times-three and times-nine multiples of an operand represented by a supplied operand signal, the method further comprising the steps of:

providing multiplexing means, operatively coupled to an output of the multiple storage register (MSR) and to an input of the BCD tripler unit, for selectively applying the operand signal to the input of the tripler unit or applying a signal stored in the multiple storage register (MSR) to the input of the tripler unit; and operating the multiplexing means to first apply the operand signal to the input of the tripler unit so as to perform said step of applying the operand signal to the tripler unit to produce the times-three signal, and thereafter operating the multiplexing means to apply the times-three signal stored in the multiple storage register (MSR) to the input of the tripler unit so as to perform said step of applying the stored signal to the tripler unit to produce the times-nine signal.

14. A method according to claim 11 wherein said step of applying the operand signal to the tripler unit to produce the times-three signal is performed in a first machine cycle and said step of applying the stored signal to the tripler unit to produce the times-nine signal is performed in an immediately following, second machine cycle.

* * * * *

UNITED STATES PATENT AND TRADEMARK OFFICE
CERTIFICATE OF CORRECTION

PATENT NO. : 5,258,945
DATED : November 2, 1993
INVENTOR(S) : Hsiao-Peng S. Lee

It is certified that error appears in the above-indentified patent and that said Letters Patent is hereby corrected as shown below:

Column 15, line 1, "firth" should be --first--.
Column 15, line 28 should be --[$A_i<0:3>+P_{i-1}<0:2>$]modulo 10;--.
Column 15, line 47, "$C_{1-1}$" should be --$C_{i-1}$--.
Column 16, line 9, "values" should be --value--.

Signed and Sealed this

Twenty-first Day of May, 1996

*Attest:*

BRUCE LEHMAN

*Attesting Officer*     *Commissioner of Patents and Trademarks*